Figure 1:
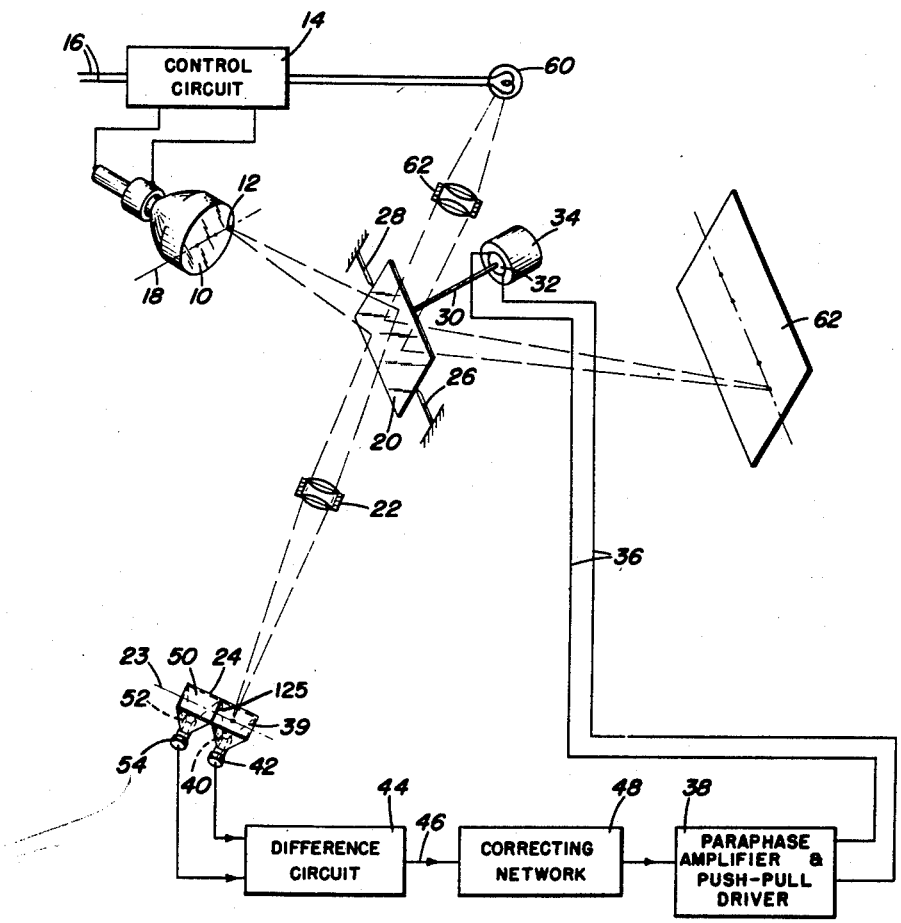

July 28, 1959 — A. LESTI — 2,897,373
SERVO PROJECTOR
Filed June 18, 1954 — 6 Sheets-Sheet 1

INVENTOR
ARNOLD LESTI
BY
ATTORNEY

July 28, 1959  A. LESTI  2,897,373
SERVO PROJECTOR
Filed June 18, 1954  6 Sheets-Sheet 2

INVENTOR
ARNOLD LESTI

BY Wayne M. Hart
ATTORNEY

July 28, 1959     A. LESTI     2,897,373
SERVO PROJECTOR

Filed June 18, 1954     6 Sheets-Sheet 3

INVENTOR
ARNOLD LESTI

BY
ATTORNEY

INVENTOR
ARNOLD LESTI
BY Wayne M. Hart
ATTORNEY

INVENTOR
ARNOLD LESTI

July 28, 1959     A. LESTI     2,897,373
SERVO PROJECTOR

Filed June 18, 1954     6 Sheets-Sheet 6

INVENTOR
ARNOLD LESTI
BY
ATTORNEY

United States Patent Office 2,897,373
Patented July 28, 1959

2,897,373

SERVO PROJECTOR

Arnold Lesti, Arlington, Va., assignor to ACF Industries, Incorporated, New York, N.Y., a corporation of New Jersey Application June 18, 1954, Serial No. 437,848

38 Claims. (Cl. 250—201)

This invention relates to devices for compelling a secondary light to follow exactly the path of a moving primary light. An important use of the invention is in connection with systems where the primary light source is inherently weak and it is desired to overcome this weakness. Then, the secondary light source will be more powerful than the primary. Even though the drawings and subsequent description deal almost exclusively with the weak primary source and strong secondary source situation, there are many other light or image combinations for which the invention is ideally suited. For example, instead of having only one secondary light, it may be a bank of two or more lights reflected onto one or more screens. Moreover, the secondary source may be of equal or less intensity than the primary source, and it need not be the same kind of light, nor the same color light.

Accordingly, with the aid of optical projection lenses, a powerful secondary source of light is projected onto a movable light reflecting member, as a mirror, which directs the light to a screen. The mirror is caused to rotate slightly through small angles, thus directing the strong light to any portion of the screen. To do this, the movable mirror preferably has its reverse side reflective to form a part of another optical path whose function is to control the exact position of the mirror by servo control.

Relatively weak, primary light originating on substantially a point source in any position of a line or area and reflected by the reverse side of the mirror, is projected by lenses onto light sensitive devices which divide the projected zone into two or four parts depending upon whether or not the light originates in any position of a line or area. The light sensitive devices are responsive to the light projected on them and produce electrical voltage outputs when light strikes them. The outputs of the light sensitive devices are amplified and applied to deflection coils which cause the mirror to rotate. The polarities of the connections are such that the mirror is rotated through a small angle so that the light sensitive devices tend to receive equal amounts of light, producing equal and opposite deflection forces on the mirror thereby causing the mirror to rotate and stop in a particular position corresponding to the position of the primary light source. In turn, the powerful, secondary source of light will be directed by the mirror to a particular position on the screen which corresponds to the position of the weak light source. The mirror is adapted to move rapidly from one position to another as the primary spots of light are turned on and off in different positions, or as a relatively weak primary spot of light is translated.

The moving mirror and the light which it directs towards the light sensitive devices, together with the amplifiers, associated electrical networks, and deflection coils, constitute an electromechanical servo system in which negative-feedback is employed to accurately and rapidly (substantially instantaneously) move the mirror to those positions corresponding to the weak controlling source of light, thereby causing the powerful source of light to be directed in an exact corresponding manner onto the projection screen. A high speed light shutter is in the path of the powerful light and may be actuated by the circuits which control the primary source of light such that the high speed shutter blocks the secondary light, preventing its projection onto the screen when the mirror is in motion while going between the positions where light is to be projected. Instead of the light shutter, the secondary light may be turned on and off by direct interruption of its source of voltage. As an alternative, a device responsive to the error voltage in the servo loop may also be employed to actuate the light shutter or light source. When the error voltage is less than a certain predetermined amount, the secondary light may pass through the projection system.

Projected images of high intensity are achieved because of a high percentage of the available light is projected on the screen to form dots or line traced out by the moving mirror. The amount of area represented by the projected dots or line is a small fraction of the total screen area which is figured in ordinary projectors. In this servo projection system, the total available light going through the optical paths is concentrated on the dots or lines, instead of being used over the entire area, as is the case in operation of the usual projector.

The method of operation of this servo projection system is to present the relatively weak spots of light for short intervals, one at a time, thus giving the servo system and the mirror a chance to orient itself separately and independently for each dot in the direction corresponding to the light. If a line is presented, this corresponds to a series of close dots. In practice, a line is a moving dot of light which may or may not be interrupted. The servo mirror will follow the moving dot, projecting a corresponding bright, moving dot on the projection screen. If a line or series of dots is presented cyclically and repetitively at a sufficiently high rate of speed to avoid flicker, the projected image will appear steady to the eye. This servo projection system will trace out dots, lines, figures, letters, or other images in which the light may also vary in intensity.

An object of the invention is to provide a light projection system which causes a secondary light to follow exactly the path of travel of a primary light, and to teach methods for doing the same.

A more specific object of the invention is to teach methods and systems which compel a secondary light to follow the movements of a primary light by displacing a light reflective member in response to the instantaneous (substantially) positions of the primary light, which positions are detected from the back reflections of the primary light from the member, the secondary light being also reflected by the same light reflective member thereby causing it to follow every desired movement of the primary light.

Another object of the invention is to provide a plural path light system wherein the path of the secondary light is a slave to the primary light path, following it exactly, and utilizing a plurality of photoelectric tubes having a screen thereover which varies in transparency from a maximum at its edges to a minimum at its center whereby the electrical outputs of the tubes are functions of the position of the light source on one or more of the tubes. Information obtained in this way is then fed into analog algebraic circuitry, the output from which is used to deflect the light reflective member an amount and the direction demanded by the location of the primary light on the screen.

Another object of the invention is to provide a light reflecting device that includes a reflective member which is pivoted to move about intersecting axes, and which is driven by electrostatic means or electromagnetic coils arranged adjacent thereto in a way that the response of the member is substantially instantaneous.

A further object of the invention is to teach methods of utilizing a closed loop feedback system for controlling the deflection of a mirror or the like with the mirror reflecting a secondary light so that it follows the movements of a primary light whose reflections provide the stimuli for the feedback loop.

And, another object is to teach methods of rapidly and accurately adjusting the angular positions of a light reflective member in response to electrical signal information generated in response to the instantaneous positions of a primary light source.

Figures 2, 3:
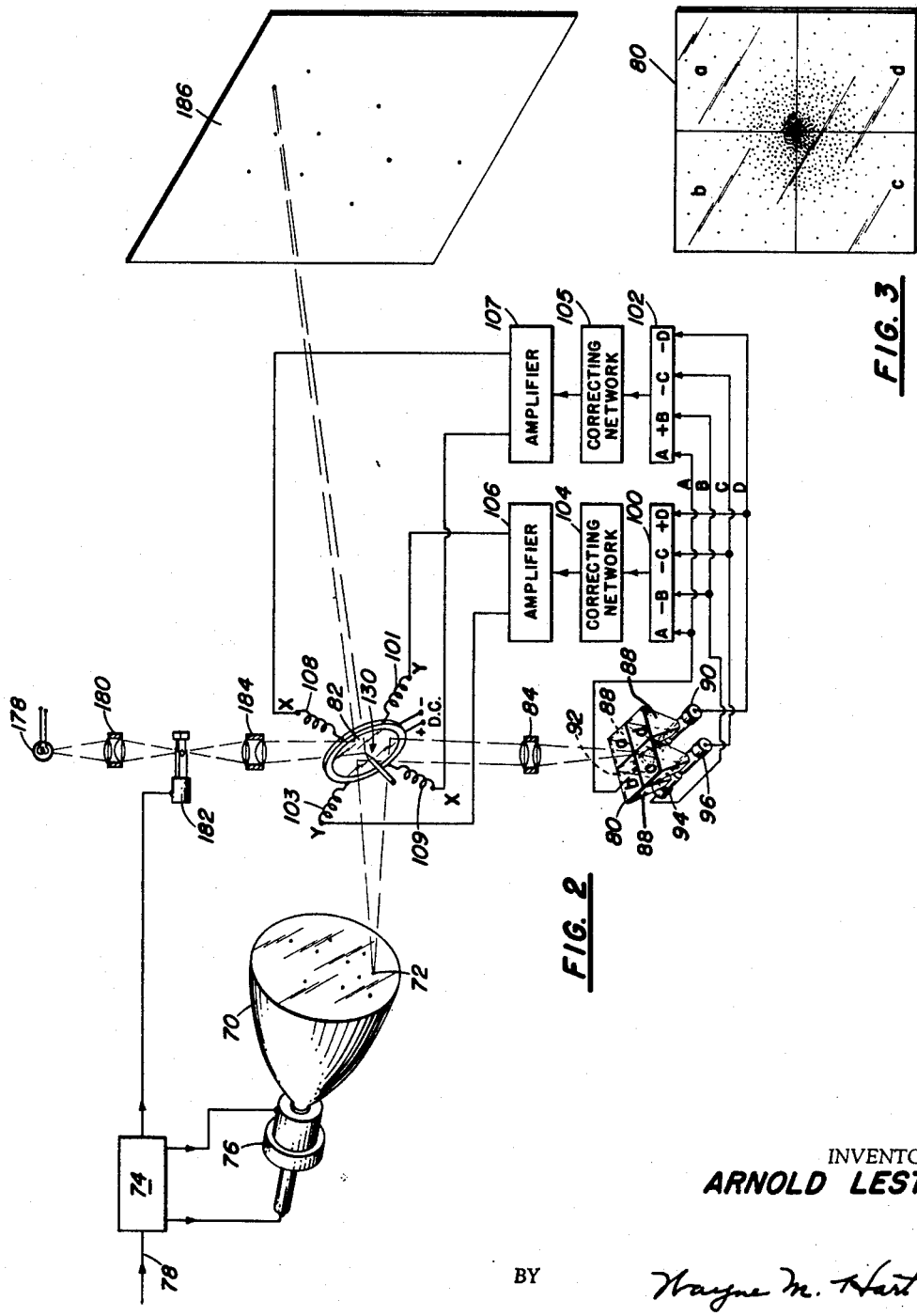
Figure 4:
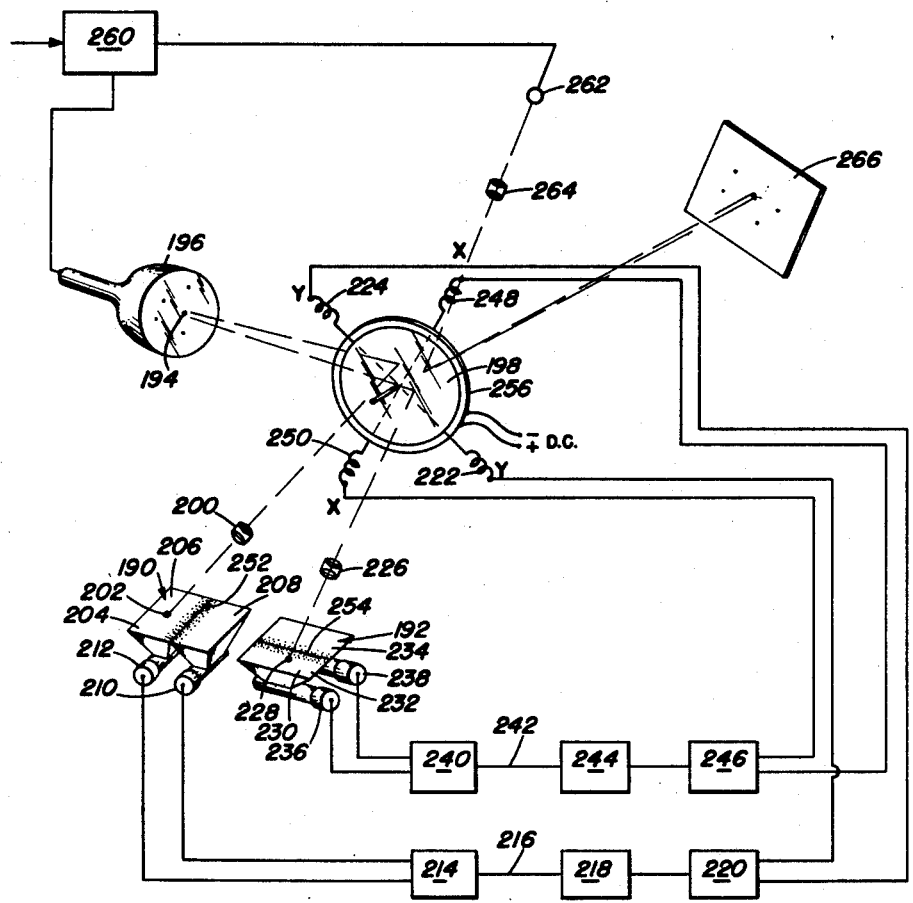
Figure 5:
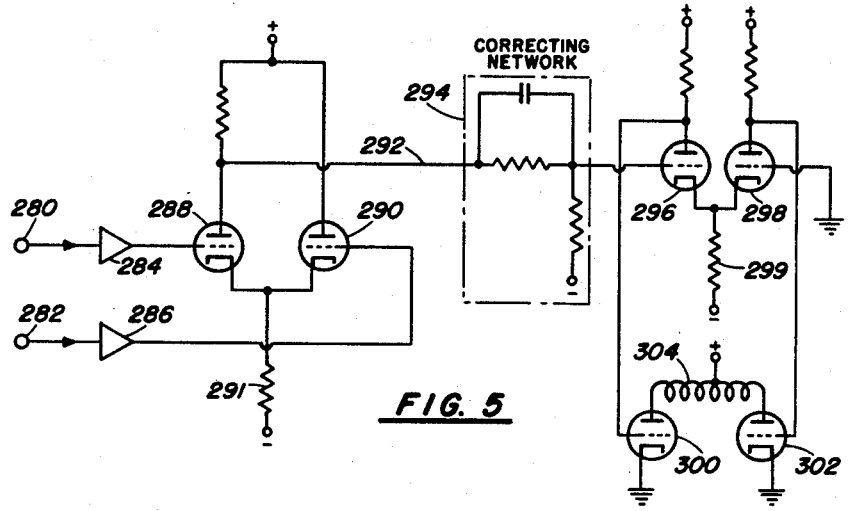
Figure 7:
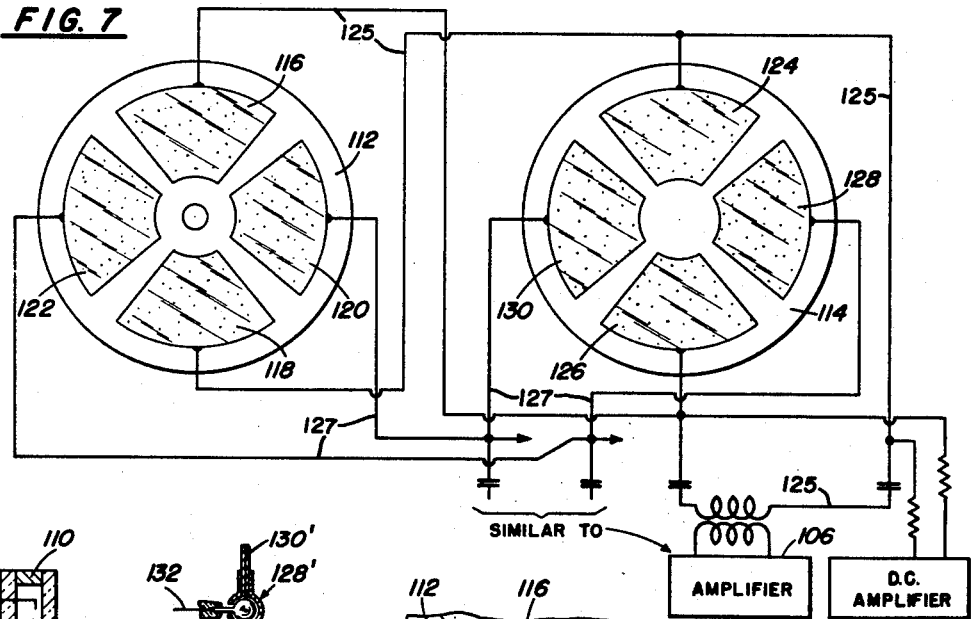
Figure 9:
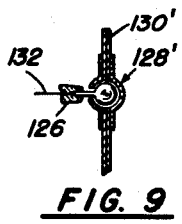
Figure 8:
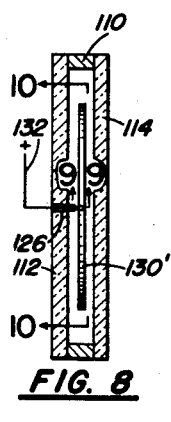
Figure 10:
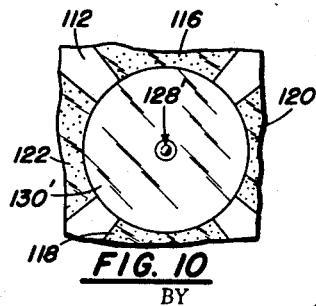
Figure 6:
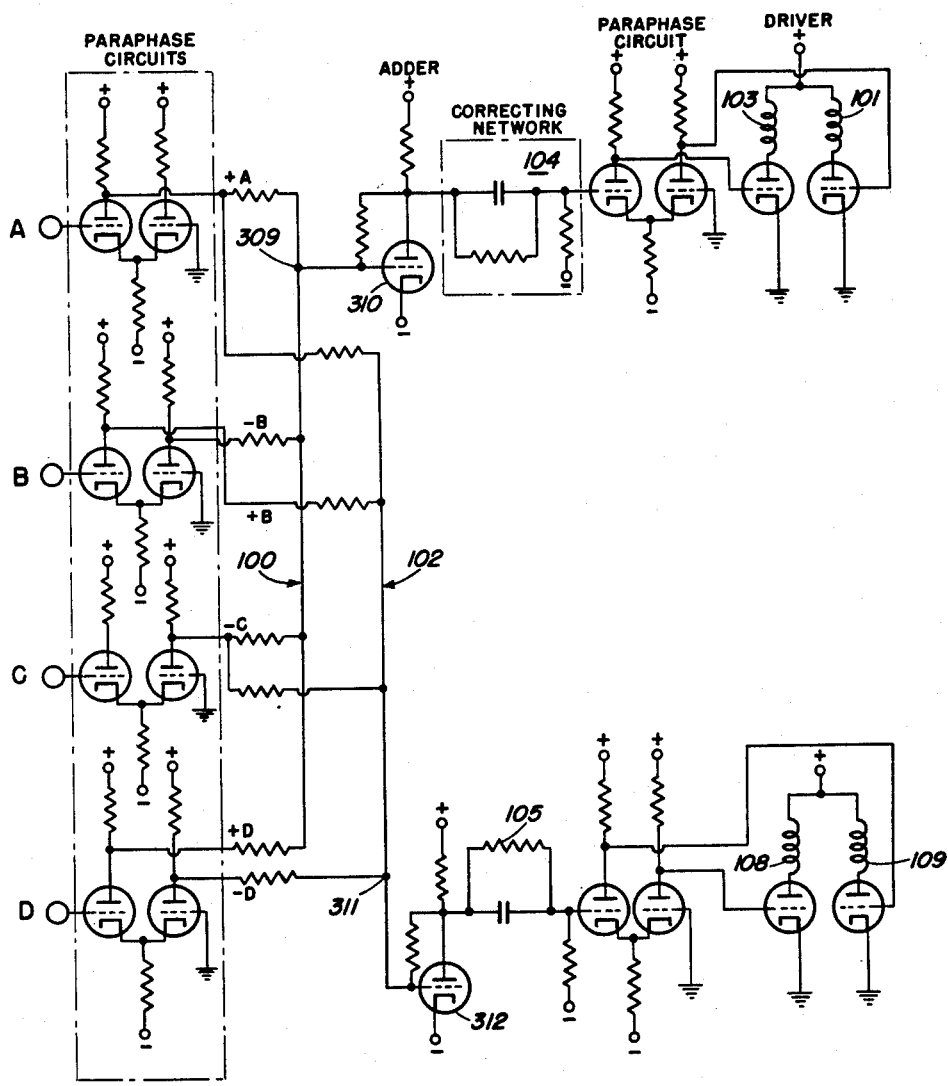
Figure 11:
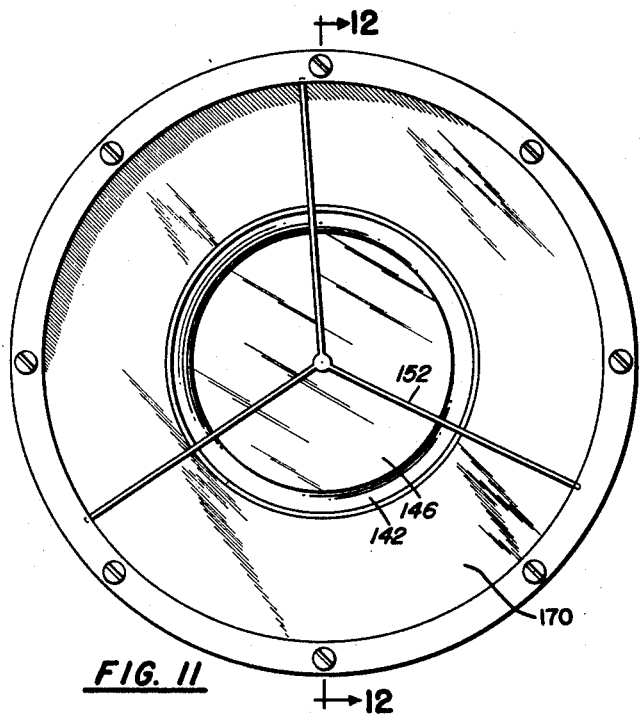
Figure 12:
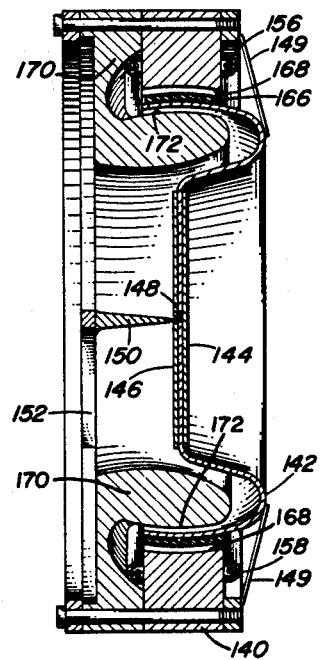
Figure 13:
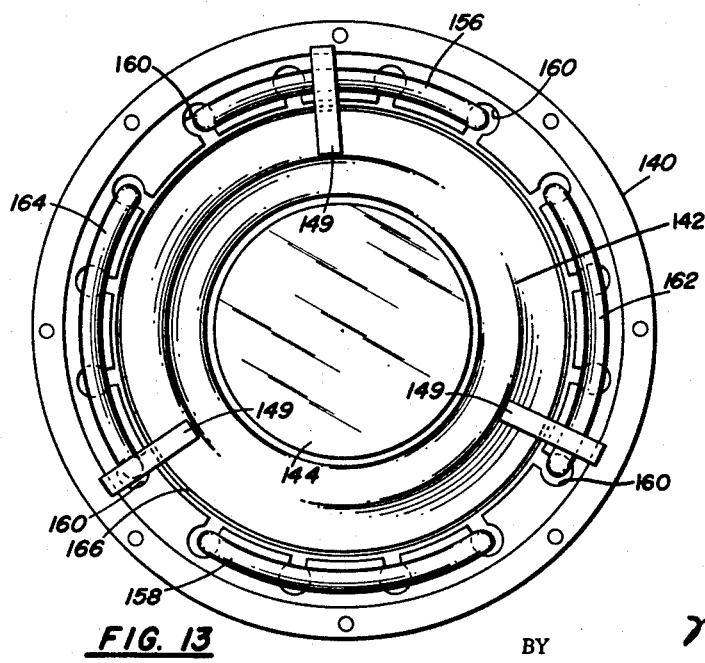

Other objects and features of importance will become apparent in following the description of the illustrated forms of the invention, wherein Figure 1 is a simplified one-dimensional servo projection system using two light sensitive devices, Figure 2 is a two-dimensional area servo projection system using four light sensitive devices arranged in a quadrant, Figure 3 is a plan view of the varied transparency light filter disposed over the quadrant, Figure 4 is a two-dimensional area projection system with the light sensitive pick-up devices of the system arranged in two independent sets, Figure 5 is a detailed schematic diagram of the circuits used in the embodiments of Figures 1 and 4, Figure 6 is a detailed schematic diagram of the circuitry required in Figure 2, Figure 7 is a schematic view of an electrostatically operated light deflecting device, Figure 8 is a sectional view of the device illustrated in Figure 7, Figure 9 is an enlarged fragmentary sectional view taken on the line 9—9 of Figure 8, Figure 10 is an elevational view of the light reflective member and taken on the plane of line 10—10 in Figure 8, Figure 11 is an elevational view of an electromagnetically operated light deflecting device to be used as an alternative for the device of Figure 8, Figure 12 is a sectional view taken on the line 12—12 of Figure 11, and Figure 13 is an elevational view of the device of Figure 11, showing the opposite side of it.

*Line system*

In Figure 1 cathode ray tube 10 is the source of relatively weak light spots such as 12 on its screen. Cathode ray tube light is inherently weak and cannot be strengthened beyond a low level, as compared to other types of known light sources. The deflection system of tube 10 is controlled by circuit 14 which received its energy from control buses 16. The control grid of tube 10 is turned on and off by the control circuit 14 which may assume any one of many well known forms, and functions to supply program deflection currents to deflection yoke of the tube 10.

As is observed from the embodiment of Figure 1, there is only one axis of deflection involved. A light spot is placed on the screen of the tube 10 and is caused to move along the horizontal line 18. Such movement is caused by current established at circuit 14 and applied to the yoke and deflection coils of tube 10. The position of the spot may be changed from time to time depending on orders received from buses 16.

Following the spot 12 through the entire system, the rays emanating therefrom impinge upon a light reflective member 20 such as a mirror, the mirror then reflecting the light to a lens 22, from which an image of the spot 12 is focused on a screen 24. The light reflective member 20 is made reflective on both sides, and it is pivoted for movement about a single axis by opposed pivots 26 and 28. Accordingly, the light from spot 12 may fall upon different portions of screen 24, depending upon the position of the reflective member 20. This screen is in reality a light attenuator such as one of the two disclosed in Figure 4, having a variable transmissive of light property. Along its centerline it is opaque and increases in transparency linearly as the distance increases from the centerline.

An actuating rod 30, held by moving coil 32 of a driver 34 is arranged to deflect the mirror 20 about its axis when the moving coil is actuated as a result of current being sent therethrough from output leads 36 of an amplifier 38. Spots positioned along line 18 on the cathode ray tube screen will be focused by lens 22 along a single line 23 near screen 24. Slight angular deflections of the reflective member 20 will shift the spots along this imaginary line 23 in one direction or another depending upon the sense of rotation of the mirror 20.

Assume that the light reflective member 20 is positioned so that the spot in question will fall upon one section 39 of screen 24. The light will go through that section of screen 24, and is reflected by a reflective funnel 40 to the photo electric multiplier tube 42. As a result the photo electric multiplier tube 42 produces a voltage which is applied to a difference circuit 44. This signal voltage will be transferred as a signal of proper polarity to a bus 46 from which it is applied to a correcting network 48 which functions to prevent oscillations and optimize the overall response in accordance with feedback theory. Even though the drawing illustrates a series including circuits 44, 48 and 38 in that order, this is not a necessary arrangement in that circuits 38 and 48 may be transposed. However, describing the illustration, the output of correcting network 48 is applied to the paraphase amplifier and push-pull driver circuit 38 which acts to take the single ended output of the correcting network 48 and convert it to balanced push-pull output to drive the center tapped moving coil 32 of the driver 34. The polarity of the connections is such that the moving current will drive the rod 30 and rotate the mirror or equivalent reflective member 20 so that the image of spot 12 on screen 24 will move toward the center line 25 of screen 24. When the image of spot 12 reaches this centerline it will continue to move until portions of the spot cross line 25 from section 39 and enter section 50 and the light enters the funnel 52 leading to photo multiplier tube 54. The voltage output of the latter tube is applied to the difference circuit 44 in sense opposite to tube 42. Therefore, the voltage of tube 54 will cause a spot to move in the direction opposite to that caused by the output voltage due to the light falling on section 39. The spot of light will therefore split on the screen centerline 25 producing equal and opposite forces on moving coil 32 and the spot will stay in that position. This assumes that there is no restoring spring force applied to the moving coil. Spring pressure will be compensated by the spot of light moving to a slightly off center position. In any case the error will be less than one half of the diameter of a dot with sufficiently high gain.

The description has dealt with a single light path from a primary source, the cathode ray tube 10 in this instance, to a plurality of photo electric tubes. The light originates from the cathode ray tube, impinges upon a light reflective member 20 which is adjustable, and then after passing through optical means falls upon the photo electric tubes. These tubes and the circuits associated with them constitute a detector to sense the position of the spot 12 of light in space or in any other medium. Not only does the spot of light become detected and located, but the circuitry also actuates the light reflective member in response thereto, whereby a secondary light source such as 60 may be made a slave to the movements and instantaneous positions of spot 12 by merely being reflected by the same light reflective member 20. This establishes a second light path which extends from source 60, through standard projection lenses 62, to the opposite surface of light reflective member 20, and conveniently located screen 62.

If the cathode ray tube 10 is of the flying spot type with short persistence screen, there will be no significant afterglow to the spot 12 when it is turned off and a subsequent spot is caused to appear on the screen. The light reflective member 20 will always be moved in response to the positions of this spot in view of the closed loop feedback system involving all of the circuitry from the photo electric tubes and the light reflective member 20. The source 60 may be extremely powerful, such as an arc light, and may be used in many fields of endeavor. For example, the light 60 may merely provide spots on screen 62 for educational, military, calculation purposes, or the light source 60 may be a very large stationary light such as a beacon, the projected rays of which are controlled by a very weak light. Source 60 may alternately be used for display purposes, as in advertising media or it may be of various colors or even a different form of electro magnetic wave energy. Whatever the case may be, a specific type of secondary source 60 is not important, the important thing being that there is a secondary electro magnetic wave energy source in order to take advantage of the mirror deflections which provide the secondary light path.

For reasons to be described subsequently and possibly already known in the art, it is desirable to interrupt the secondary light source 60 in coordination with motion of spot 12. Control circuit 14 is used to do this although a light shutter, as in Figure 2, may be selected. In any event, this expedient is resorted to in order to have the image on screen 62 more correctly portrayed.

Area system

The embodiment of Figure 2 is an area projection system analogous to that of Figure 1, using plural light paths, together with a closed loop feedback system for control. Again, a cathode ray tube 70 having an object light source, for example spot 72, has been selected as the primary light source. The spot 72 is deflected over the phosphor screen of tube 70 to any point by the fields of deflection coils of yoke 76 energized from the control circuit 74. Circuit 74 is of a well-known type, energizing the deflection system of tube 70 and the control grid thereof. Both vertical and horizontal coils are present in the deflection yoke 76 in order to move the spot 72 to any position on the cathode ray tube screen. The control circuit obtains its information from an external source as indicated generally by bus 78.

The light from spot 72 impinges onto a light attenuating screen 80 by means of a reflective member 82. Member 82, like member 20, may assume the form of a mirror, highly polished metal surface, or even a prism. Member 82 is adapted to move about X and Y axes by means to be described subsequently.

Light reflected from member 82 passes through a lens 84 to condense the light and focus it upon or slightly beyond screen 80. This screen is opaque in the center (Figure 3) and is sectioned into quadrants $a$, $b$, $c$ and $d$. The screen 80 decreases in opaqueness (increases in transparency) from its center linearly to its edges.

All light falling on one of the quadrant sectors of screen 80 is directed by suitable reflective funnels, as at 88, to its associated light sensitive device, for example, a photo electric tube. There are four of such tubes, 90, 92, 94 and 96, each having its own funnel 88 and each being disposed behind one of the sectors, $a$, $b$, $c$ and $d$.

The outputs of the photo electric tubes are conducted by circuitry to two analog algebraic adder circuits, 100 and 102 respectively, in order to control deflection of the member 82, about intersecting axes, as the X and Y axis. If the voltage outputs of photo electric tubes 90, 92, 94 and 96 are designated by the letters A, B, C and D, then circuit 100 performs the operation $(A+D)-(B+C)$, and applies the result to the correcting network 104, and amplifier 106, which in turn, drives the horizontal deflection coils for member 82 schematically shown at 101 and 103. The polarity of the connections is such that if $(A+D)$ is greater than $(B+C)$, the output of circuit 100 is positive and the horizontal movement of the light spot on the screen 80 is from right to left. If $(A+D)$ is less than $(B+C)$, the output of circuit 100 is negative and movement is from left to right.

For the vertical deflection system analog algebraic adder circuit 102 performs the operation $(A+B)-(C+D)$ and applies the result to the correcting network 105 and amplifier 107 which drives the vertical deflection coils 108 and 109. The polarity of the connections is such that if $(A+B)$ is greater than $(C+D)$ the output of circuit 102 is positive and the vertical movement of the spot of light on screen 80, is from top-to-bottom (relative to the drawing). If $(A+B)$ is less than $(C+D)$, the output of the circuit 102 is negative and movement is from bottom-to-top. The combined operations of the algebraic adders 100 and 102 and their associated circuits are to cause the spot of light which falls on screen 80 to move towards the center thereof until the amounts of light falling on each of the tubes 90, 92, 94 and 96 are substantially the same. Then $(A+D)-(B+C)=0$, and $(A+B)-(C+D)=0$, if there is no restoring force on the light reflective member 82. Otherwise, these differences will be somewhat different from zero sufficiently to overcome the restoring force. With high gain in the amplifiers the spot of light will fall with its center on or very near the junction of areas $a$, $b$, $c$ and $d$.

Electrostatic reflective device

Light reflective member 82 is reflective on both sides and is mounted preferably on a single pivot at its center so that it is free to move not only about intersecting axes but about a single center. Member 82, its coils and member 198 (Figure 4) with its coils subsequently mentioned, are schematically represented in Figures 3 and 4. In this regard, attention is invited to Figures 7–13 inclusive where two detailed devices are shown which may be used for them. In Figures 7–10 an electrostatic light reflective device is illustrated in detail. This may be used in one or more of the embodiments of the invention. It consists of a housing 110 (Figure 8) having opposed transparent walls 112 and 114 on which are formed transparent coatings. On wall 112 there are transparent conductive coatings 116, 118 and 120, 122 (Figures 7 and 10). On wall 114 there are formed coatings 124, 126 and 128, 130 (Figure 7). These coatings are transparent to light but are electrically conductive on the electrically insulating transparent walls 112 and 114. Examples of such coatings are found in prior U.S. patents, for example Patent No. 2,617,742.

A mounting bracket 126 (Figure 9) is provided in the housing 110 and at the end thereof there is a ball-joint connection 128' with light reflective member 130'. This light reflective member is coated with reflective and electrically conductive coating and is located wholly within the housing 110. Means, such as wire 132, enter the housing 110 and apply a bias voltage to the conductive coating on light reflective member 130'.

By means of illustrated wiring the coatings on walls 112 and 114 (Figure 7) are connected in sets. Therefore, when a signal voltage is applied of opposite polarities to a certain of the coatings, for example, 124 and 126 by circuit 125, the movable light reflective member 131 is caused to tilt about a vertical axis as viewed in Figure 7. This takes place because a bias potential is applied to the coating on the light reflective member 130' and it is attracted to the sector 124 or 126 of opposite polarity and simultaneously repelled from the sector 126 or 124 of like polarity. The amount of tilting displacement of reflective member 130' is directly proportional to the force set up between the voltage applied to sectors 124 and 126 and the bias voltage on reflective member 130'. As shown in Figure 7, sectors 118 and 116 are connected in parallel respectively to sectors 124 and 126 and aid in tilting the reflective member 130' by the charged sectors 124 and 126. In a similar manner, sectors 128 and 130 are connected in parallel respectively to sectors 122 and 120 by circuit 127 to tilt the reflective member 130' about a horizontal axis, as viewed in Figure 7, by the application of opposite charges to opposed sectors. It is apparent that either the wall 112 or the wall 114 may be provided with coatings, or as illustrated, both walls may have coatings, depending upon the demands of the particular installation.

Electromagnetic reflective device

In Figures 11–13 there is an electro magnetically operative light reflective device which may be used in place of the electrostatic devices 82 and 198 of Figures 2 and 4, respectively. It consists of a pole piece assembly formed of a pair of annular pole pieces 140 and 170. A diaphragm 142 is supported within the annulus of pole piece 170, and on opposite sides of which there are mirror elements 144 and 146 respectively. The diaphragm is light weight material, as spun aluminum, and the mirror elements may be cemented in place or may be formed directly on the diaphragm. A central pivot support 148 mounts the diaphragm for pivotal movement. Connection 148 may be identical to support 128 (Figure 9), and mounted at the end of a bracket 150 carried by a spider 152. The spider is appropriately fastened to the peripheral portion of pole piece 170 and is in the primary light entrance. Leaf springs 149, each secured at one end to the pole piece assembly and bearing at the other end on diaphragm 142, are optional. When used, they function to yieldingly hold the diaphragm on pivot support 148.

Horizontal deflection coils 156 and 158 respectively are connected in series and mounted in slots 160 provided in pole piece 140, as shown. Coils 156 and 158 are similar to those of a two pole stator winding of a motor. There is a pair of vertical deflection coils 162 and 164 assembled in pole piece 140. In order to interact therewith, there is a moving coil 166 on an edge of diaphragm 142. This coil has a partially spherical surface disposed near a concave spherical surface 168 of pole piece 140. The pole piece 170 has an annular convex spherical surface 172 facing the concave surface 168. Spherical surfaces 168 and 172 are concentric with pivot support 148 at the center. Thus, limited tilting movement of the assembly, consisting of coil 166, diaphragm 142 and mirrors 144 and 146, is possible without touching the pole pieces 140 and 170 and yet there is maintained, during tilting, a constant width magnetic gap between coil 166 and the pole piece surfaces 168 and 172.

As observed in Figure 2, horizontal deflection coils 108 and 109 correspond to coils 156 and 158 when the electro magnetic device of Figure 12 is used in embodiment of Figure 2. Similarly, coils 103 and 101 will correspond to coils 164 and 162. Then, amplifier 107 will furnish coils 156 and 158 with deflection currents in order to generate a magnetic field which interacts with the constant current field generated in moving coil 166 to tilt the assembly of diaphragm 142 in either direction about a horizontal axis. Amplifier 106 provides current to deflection coils 162 and 164 in order to generate a magnetic field which also interacts with that of coil 166 to tilt the assembly of diaphragm 142 in either direction about a vertical axis. The vertical and horizontal coils may be energized simultaneously and the relative magnitudes of the fields will determine the direction of deflection and amount of deflection. As an alternative, either the vertical or horizontal coils may be energized, in which case the deflection of the diaphragm 142 will be governed thereby.

Regardless of which light reflective device is selected, the servo system of Figure 2 employs a secondary light 178 which is wholly independent of the primary light. The rays therefrom pass through condensing lens 180 to allow operation of a high speed shutter 182 after which the light passes through projection lens 184 prior to falling on one surface of the light reflective member 82. This member directs the secondary light to a screen 186 on which a light image is formed. As the movable member 82 is deflected in accordance with the dictates of the primary light position on screen 80, the secondary light is similarly deflected. Shutter 182 is controlled by circuit 74, the same as spot 72, so that the secondary light source is withheld from member 82 at such time that spot 72 is in motion. Using such an expedient permits substantially instantaneous samplings of the light position.

Separated path system

In Figure 4 there is a system which is quite similar to that shown in Figure 2, except for the quadrant photo electric pick-up device. Instead of a single unit, there are two sets of pick-up units 190 and 192, each being similar to that illustrated in Figure 1. Moreover, the primary light, as spot 194 on cathode ray tube 196, is split so that it takes two paths after leaving light reflective member 198. The path of primary light being split passes through individual lens 200 and lens 226. Considering first that light which passes through lens 200, the back reflection of spot 194, is focused as a spot 202 on screen 204 which is identical to screen 24 of Figure 1. It has sections 206 and 208 over reflective funnels and photo multiplier pick-up tubes 210 and 212 which feed into circuitry consisting of difference amplifier 214, bus 216, connection network 218, paraphase amplifier and driver 220, and schematic illustrated horizontal deflection coils 222 and 224. In a similar manner, the reflected light from member 198 is focused by lens 226 as a spot 228 on screen 230 having sections 232 and 234. The light is collected by funnels and sent to tubes 236 and 238 which feed into circuitry consisting of difference amplifier 240, bus 242, correcting network 244, paraphase amplifier and driver 246 and vertical deflection coils 248 and 250.

The sections 206, 208, 232 and 234 have variable density light transmitting properties similar to those of the sectors of the screen in Figures 1 and 2. When member 198 tilts in a horizontal direction a spot such as 202 on screen 204 moves in a direction perpendicular to zero light transmissive line 252. The intensity of light falling on the photo electric tube 212 is directly proportional to the distance of the spot from line 252 because the transparency of screen 204 varies linearly from a minimum of zero at line 252 to a maximum at its edges. Similarly, the density of light from a spot such as 228 reaching photo electric tubes 236 or 238 is directly proportional to the distance of the spot from line 254. When member 198 tilts in the vertical direction, a spot such as 228 moves in a direction perpendicular to line 254. Accordingly, error voltages developed in buses 216 and 242 are proportional to the angular errors of the light reflective member from its true intended position. This produces in the field of moving coil 256 of member 198 an error force vector whose absolute magnitude is proportional to the amount of correction rotation needed. This is true for all instantaneous vectors for the embodiment of Figure 4, but only true for average sets of sectors for the system in Figure 2.

An electrical control circuit 260 is used in conjunction with cathode ray tube 196, in order to control the behavior and nature of image 194 on the tube screen. The secondary light 262 may be controlled by circuit 260, that is, through direct interruption, or a shutter such as that indicated at 182 may be used. In either case secondary light passes through a lens 264, impinges upon light reflective member 198 and is reflected on screen 266, appropriately located. Accordingly, information obtained by dictation of the instantaneous positions of spot 194, is converted to electrical signals, the magnitude and sense of which vary in accordance with the spatial position of the spot. The signals are impressed upon the various coils to deflect the pivot light reflecting member 198 to the appropriate new positions. At the same time the secondary light is correspondingly moved on screen 266 since it is reflected by member 198.

*Circuits*

Figure 5 illustrates a possible circuit for the system shown in Figures 1 and 4. The pair of photo electric tubes 280 and 282 are shown connected to amplifiers 284 and 286 respectively. The outputs from the amplifiers are applied to the difference circuit consisting of amplifying tubes 288 and 290 with a common cathode resistor 291. A voltage proportional to the difference of voltage outputs of tubes 280 and 282 is present on the bus 292. In turn, bus 292 feeds correcting network 294 which allows the signal to go through with an added derivative component to stabilize properly the feedback response. This is merely one selection (294) of correcting networks, others known in the art may be used.

The single ended output of the correcting network 294 is converted into a push-pull signal by being applied to a paraphase circuit consisting of amplifying tubes 296 and 298 with a common cathode resistor 299. The push-pull output of the paraphase circuit is applied to the push-pull power driver consisting of amplifying tubes 300 and 302 with the center tapped moving coil 304 on the plate circuits as shown. The coils may be connected in the cathodes circuit as an alternative. In the case of a system as in Figure 1, the moving coil consists of two sections with a center tapped connection between them. However, it is apparent that two entirely separate coils may be used, one connected to tube 300 and the other connected to tube 302. The latter condition is applicable to the system illustrated in Figure 4 involving two complete circuits of the type shown in Figure 5.

Figure 6 illustrates a possible circuit for units 106, 107 and 100, 102 and the corrective networks 104 and 105 of Figure 2. The phototube outputs A, B, C and D of Figure 2 may be amplified before being applied to the corresponding circuits of Figure 6. Each of the phototube outputs A, B, C, D is connected to a paraphase circuit so that both direct and reversed signal voltages are available on the outputs. All summing resistors from the paraphase circuits to the adders are of the same value. Circuit 100 consists of resistors connected respectively to the +A, +D, −B and −C output points of the paraphase circuits and to the common summing point 309 of adder tube 310. Circuit 102 consists of resistors connected respectively to the +A, +B, −C and −D output points of the paraphase circuits and to the common summing point 311 of adder tube 312. The outputs of the summing tubes are applied respectively to the correcting networks 104 and 105. The single-ended outputs of these latter networks are connected, in turn, to a paraphase circuit and associated power driver tube with deflection coils connected thereto in a manner similar to that described hereinabove in relation to the circuitry of Figure 5.

The normal quiescent currents going through the deflection coils 101 and 103 of Figure 2, are in such a direction that they produce approximately equal and opposite forces which press the member 82 against pivot 130 with no tendency to tilt it. The same applies to coils 108 and 109. In the case of Figure 1, the quiescent currents through the moving coil 32 produce cancellation in their respective magnetic fields. Referring to Figure 12, the magnetic forces from the quiescent direct current components in the yoke coils 156, 158, 162 and 164 react with the field produced by the direct current going through the moving coil 166 to produce a force tending to direct the moving mirror as a whole against the pivot, the pressure being concentrated at pivot 148. The quiescent direct current is determined by the operating point of the driver tubes, such as tubes 300 and 302 of Figure 5, or the corresponding driver tubes of Figure 6, when no signal voltages are applied to them. On the other hand, when a signal voltage is applied, if the current going through one tube increases, it will decrease in the other member of the push-pull pair. Thus, the force on the moving coil tending to tilt it in a given direction will increase on one side, and the force on the other side in the opposite direction is decreased. The net result is a force tilting the moving coil and reflective member about its pivot. The direction of tilting depends upon the polarity of the signals into the driver tubes. The operation of the moving coil of Figure 1 is analogous in that there is an increase of current in a given direction in one-half of the coil simultaneously with a decrease in the current going through the other half of the coil in the opposite direction.

The system illustrated in Figure 1 may be used as an element of a larger system. For example, the screen 62 may be removed from its indicated position and a second mirror similar to 20 inserted in the position with the axis of rotation oriented perpendicular to the axis of the first mirror 20. The second mirror would have associated with it a servo system such as the one required for the first including, in one version, another cathode ray tube. The lens 62 would be readjusted to focus the light on a two-dimensional display screen. The X and Y components would then be under the control of the independent linear displacements on the two cathode ray tubes. Other arrangements are possible. The ones indicated in Figures 2 and 4 have the advantage of directness and overall simplicity.

The above system may be used in conjunction with a phosphorescent screen. The powerful source of light could be chosen appropriately or filtered to excite the phosphorescent screen. The persistence time of the phosphor on the screen would be long enough to maintain light output and reduce flicker when the servo mirror is moving through the various positions at such a rate that flicker would be produced without the phosphor.

*Methods*

The objects of the invention have been stated, and the preceding pertains primarily with structural means of attaining these objects. The methods disclosed herein are considered of significance in the art due to their practicability of practice. In a situation where there is a light, arbitrarily designated herein as primary, another light arbitrarily designated as secondary may be made to follow the movements of the primary light. Accordingly, a prerequisite is a primary light source. It may be an image, as a spot, on a cathode ray tube screen but need not necessarily be. It could be a flashlight manually held and moved, or a star. In any case, the primary light is reflected by a light reflecting surface, and the back reflections are brought to a focus point. The spatial position of the focus point of reflected primary light is detected, and information of the instantaneous position is obtained.

A light attenuating technique is used to make the detections. A point or line in space is selected as a datum from which linear measurements may be made. In the structural embodiments, this corresponds to the zero light transmissive lines or points on the screens 24, 80, 190 and 192. The distance that the primary light reflection is from the datum governs the amount of light which is attenuated from the back reflection of the primary light. The remainder is used to generate an electrical signal, the value of which varies in proportion to the light intensity of the said remainder. The detection described so far will yield an electrical signal proportional in value to the distance of the back reflection from a datum. The sense of the signal is determined by having separate light pick up units, a photo cell, on each side of the datum or in quadrature. Then, the signals will be generated by the pertinent one or ones with the signs of the signals properly accounted for.

Signals so obtained, are amplified and algebraically added prior to use. The mechanical element used to reflect the primary light is movably mounted, and it is deflected in response to the commands of the signals. But these signals inform of the position of the reflected light, thereby providing a closed loop feedback system, the mirror moving to new positions almost instantaneously as demanded by movement of the primary light source.

A secondary light may be directed to impinge upon the light reflective member, or any unused part of it, front or back or side surfaces, so long as they will reflect satisfactorily. Appropriately locating a screen for the secondary light reflections will provide a visual record of the movements of the primary light. For a permanent record, a light sensitive recording device of any known type may be energized by the secondary light reflections from the light reflective member. For a basic example, the screen may be photo sensitive, either moving at a controlled rate or stationary, and then, the light path thereon would be recorded.

There are alternate methods of converting the electrical signals to mechanical movement of the light reflective member. Both are essentially the same and involve the steps of applying the signal to a zone or zones adjacent to the light reflective member. It is preferred that these zones be arranged in quadrature along the edge of the member. Then, if it is necessary to correct by motion about either an X or a Y axis, the signal is fed to the proper zones.

The signals may exert electromagnetic or electrostatic motivated force on the member by interaction with a field strength or bias potential respectively. The latter are independently applied to the movable light reflecting member.

It is apparent that various modifications and changes may be made without departing from the invention.

What is claimed is:

1. A light energy servo system comprising a primary source of moving light, means responsive to the instantaneous positions of said light for producing electrical signals, a reflective member arranged to direct said primary light to said means, means operatively connected with said member and said responsive means for deflecting said member to positions corresponding to the intensity and sense of the signals, and a secondary light source reflected by said member thereby following movements of the primary light.

2. In the light energy system of claim 1 said reflective member comprising a light reflective device, means mounting said member for pivotal movement, and means operatively connected with said member for pivotally deflecting said member in response to the signals of said responsive means.

3. The device of claim 2 wherein said member deflecting means includes a coil connected with said light reflective member and having means to energize it, and electrical conductive means adjacent to said coil to attract and repel said coil.

4. A light energy servo system comprising a primary source of moving light, means responsive to the instantaneous positions of said light for producing electrical signals, a light reflective device arranged to direct said primary light to said responsive means for producng electrical signals, means connected with said device and said responsive means for deflecting said device to positions corresponding to the intensity and sense of the signals, a secondary light source reflected by said device to thereby follow movements of said primary light, said light reflective device comprising a light reflective member, means mounting said member for pivotal movement about a center point, and electrically conductive means operatively associated with said light reflecting member to deflect said member about said center point.

5. In a light energy system the combination comprising a primary source of movable light, signal producing means responsive to the position of said light, a light reflecting device arranged to direct said primary light to said signal producing means, means connected with said device and with said signal producing means for deflecting said device to positions corresponding to the intensity and sense of the signals, and a secondary light source directed to said device to be reflected to follow movements of the primary light, said device comprising a pivoted light reflective member, a deflection yoke, deflection coils carried by said yoke, a moving coil carried by said light reflective member to establish a magnetic field to interact with the variable fields of said deflection coils to move said member, said yoke having an annular slot provided with inner and outer surfaces between which said moving coil is located, said surfaces being fragments of spheres concentrically arranged about a pivot point centrally engaging said light reflecting member.

6. A light energy servo system comprising a primary source of moving light, means responsive to the instantaneous positions of said light for producing electrical signals, a light reflective device arranged to direct said primary light to said responsive means for producing electrical signals, means connected with said device and said responsive means for deflecting said device to positions corresponding to the intensity and sense of the signals, a secondary light source reflected by said device to thereby follow movements of said primary light, said light reflective device comprising a housing having at least one light transmissive wall, a light reflective member provided with an electrically conductive surface to which a bias voltage is adapted to be applied, means mounting said member in said housing for movement about a point center, and light transmissive means on said wall coacting with said conductive surface to deflect said member.

7. A system according to claim 6 wherein said light transmissive means comprises coatings disposed on intersecting axes which pass through said point center, and adapted to receive signal voltages which coact with the bias potential for establishing a deflecting force on said member.

8. A light energy servo system comprising a primary source of moving light, means responsive to the instantaneous positions of said light for producing electrical signals, a light reflective device arranged to direct said primary light to said responsive means for producing electrical signals, means connected with said device and said responsive means for deflecting said device to positions corresponding to the intensity and sense of the signals, a secondary light source reflected by said device to thereby follow movements of said primary light, said light reflective device comprising a housing having opposed transparent walls, a light reflective member disposed between said walls and having electrically conductive opposite surfaces, means to apply a bias voltage to said surfaces, means mounting said member for movement about X and Y axes between said walls, X axis transparent coatings on said walls, Y axis transparent coatings on said walls, circuit connections between the X axis coatings of one wall and the X axis coatings of the opposite wall, circuit connections between the Y axis coatings of said walls, and means to apply signal voltages to said coatings establishing potential differences with said surfaces on said member, thereby deflecting said light reflecting member in response to the signals.

9. A system according to claim 8 wherein said housing is filled with gas under a pressure greater than atmospheric to increase the high voltage breakdown point.

10. A system according to claim 8 wherein said housing is evacuated to increase the high voltage breakdown point.

11. In a plural path light system, a primary source of moving light, a light reflecting member confronting said source, a secondary source of light reflected by said member, and means for detecting the path of movement of said primary light and for deflecting said member in response to instantaneous positions of said primary light so that the reflected secondary source of light follows the movements of the primary light.

12. In a plural path light system, a primary source of moving light, a light reflecting member confronting said source, a secondary source of light reflected by said member, means for detecting the path of movement of said primary light and for deflecting said member in response to instantaneous positions of said primary light so that the reflected secondary source of light follows the movements of the primary light, said means including a quadrant of photoelectric tubes, a light screen between said quadrant and said member, said screen varying in opaqueness from a maximum at its center to a minimum at its edges, means to produce electrical signals in response to the amount and position of the primary light on said quadrant, and means responsive to said electrical signals for moving said light reflecting member.

13. The system of claim 12 and; said member moving means including a quadrant of coils, and a moving coil on said member coacting therewith.

14. In a plural path light system which includes a weak source of moving light and a strong source of light, means for compelling the strong light to follow the exact path of travel of the weak light comprising a light reflective member on which said weak and said strong lights impinge, and means in the back reflection of said weak light for detecting the instantaneous positions of said weak light and for moving said light reflective member to follow the weak light.

15. In a plural path light system which includes a weak source of moving light and a strong source of light, means for compelling the strong light to follow the exact path of travel of the weak light comprising a light reflective member on which said weak and said strong lights impinge, and means in the back reflection of said weak light for detecting the instantaneous positions of said weak light and for moving said light reflective member to follow the weak light, including a plurality of photoelectric tubes, a varied opaqueness light screen thereover, means connected with said tubes for amplifying the outputs thereof, and means operatively connected with said member to deflect the member in response to the signal output of said amplifying means.

16. The system of claim 15 wherein said photoelectric tubes are arranged in quadrant formation, and wherein analog algebraic adder circuits are connected between said tubes and said amplifying means.

17. A light servo system comprising a primary moving light source, a light reflective member confronting the primary light, a fixed secondary light source reflected by said member, means for deflecting said member in response to movement of the primary light including a closed feedback loop which is controlled by the position of the back reflection of the primary light from said member.

18. The system of claim 17 wherein said feedback loop includes at least two photoelectric tubes masked by a variable transparency cover to adjust the amount of light falling on said tubes in response to the position of the light on the cover, an analog algebraic adder circuit connected with said tubes, the outputs of which pass through an amplifier and corrective network and emerge as electrical signals, and means responsive to those signals for shifting said member.

19. In a light system, a primary and a secondary light path emanating from light sources and impinging upon a light reflector movable about X and Y axes, a quadrant located in the back reflection of the primary light from the reflector, means for moving said reflector in response to movements of the primary light thereby similarly moving the reflection of said secondary light, means for varying the intensity of reflection of the primary light in response to its distance from the center of said quadrant, means for sensing the sector of the quadrant on which the primary light reflection falls and generating signal voltage information of a sense corresponding to the sensed quadrant sector and a magnitude, proportional to the varied intensity of the reflection, and means for shifting said light reflector about said axes in accordance with said signal voltage information.

20. In a light reflective system, a primary and a secondary light path emanating from independent light sources and impinging upon a light reflector movable about intersecting axes, a quadrant disposed in the back reflection of the primary light from the reflector, means for moving said reflector in response to movements of the primary light thereby correspondingly moving the reflection of said secondary light, means for condensing said back reflection to a spot falling upon at least one of the sectors of said quadrant, means for varying the intensity of said spot as it passes through said quadrant in accordance with its distance from the center of said quadrant, means for generating a signal voltage to a magnitude corresponding to the light intensity of the spot after passing through the quadrant and of a sense responsive to the particular sectors on which the spot falls, means for algebraically adding the signal voltages, means for transducing the results to mechanical rotation of said reflector about said axes thereby shifting the back reflection of the secondary light in accordance with the motion of the primary light.

21. In a light servo system for requiring a secondary light to follow the movements of a primary light, primary and secondary light sources, a light reflective member to reflect both of said lights, means for reflecting of the primary light into a region having four zones in quadrature, means for varying the intensity of the primary light in said region in accordance with its distance from the intersection of said zones, means for deriving an electrical signal which is proportional to the varied light intensity and which signifies the zone in which it falls, and means for moving said light reflective member by said electrical signal so that the member movement is proportional to said signal.

22. The system of claim 21 wherein moving said light reflective member comprises the establishment of fields adjacent to said member and in the presence of an interacting field on said member.

23. In a light servo system, including a movable primary light, a secondary light, and a movable light reflective member which separately reflects both of said lights, means for shifting said member to follow the motion of the primary light means for splitting the back reflection of the primary light into two paths, means for condensing the light of each to X and Y spots, means for separately detecting the X and Y distances of said spots from fixed datum lines, means for deriving electrical signals proportional to the detected distances, and means for moving said light reflective member to a new position as commanded by said electrical signals thereby shifting the back reflection of the secondary light.

24. The system of claim 23 wherein separately detecting the X and Y distances comprises the attenuation of light from the said spots, the amount of light subtracted varying linearly as the distance from the spots from the datum lines of each.

25. The system of claim 23 wherein said secondary light is interrupted while said light reflective member is in motion.

26. In a light reflecting arrangement having a moving primary light, a closed loop feedback system comprising a pivoted light reflective member from which information of the position of the primary light is available, a light sensitive element for generating a signal voltage, light attenuating means intercepting the primary light reflections before they reach said light sensitive element, said attenuating means functioning to pass an amount of light which is proportional to the distance of said reflections from a predetermined point so that the signal generated by said light sensitive element provides a linear distance measurement of the movement of the primary light from a particular starting point, and means to apply this distance measurement signal to said pivoted light reflective member as corrective pivotal movement.

27. The combination of claim 26 and; a secondary light source having its rays directed upon said light reflective member, and means for intercepting the reflections of said secondary light from said member.

28. The combination of claim 27 and; said moving primary light having translation motivating means operatively associated with it, and secondary light source interruption means connected with said motivating means to temporarily prevent light rays from reaching said intercepting means.

29. In a light reflecting arrangement having a moving primary light, a closed loop feedback system comprising a pivoted light reflective member from which information of the position of the primary light is available, a light sensitive element for generating a signal voltage, light attenuation means intercepting the primary light reflections before they reach said light sensitive element, said attenuation means functioning to pass an amount of light which is proportional to the distance of said reflections from a predetermined point so that the signal generated by said light sensitive element provides a linear distance measurement of the movement of the primary light from a particular starting point, first electrically conductive means carried by said light reflective member and adapted to be constantly energized from an external source, second electrically conductive means adjacent to the first conductive means to receive said distance measurement electrical signal, and said second conductive means being sufficiently close to said first conductive means that the last mentioned electrical signal may cause an interaction between said first and second means for deflecting said member to positions corresponding to the magnitude of said signal.

30. In a light reflecting arrangement having a moving primary light, a closed loop feedback system comprising a pivoted light reflective member from which information of the position of the primary light is available, a light sensitive element for generating a signal voltage, light attenuation means intercepting the primary light reflections before they reach said light sensitive element, said attenuation means functioning to pass an amount of light which is proportional to the distance of said reflections from a predetermined point so that the signal generated by said light sensitive element provides a linear distance measurement of the movement of the primary light from a particular starting point, electrically conductive means mechanically connected to said light reflective member, stationary conductors separated from said conductive means but in the field of interaction therewith, and circuit members including an amplifier connected to said conductors to apply said distance measurement electrical signal to said conductors for interaction with said conductive means to shift said light reflective member in response to said signal.

31. In a light system which has means including at least two light sensitive voltage output producing devices for sensing the spatial position of a light source, a difference circuit into which said outputs are fed and comprising a pair of amplifying tubes with a common cathode resistor, means connecting the plates of said tubes from which a single ended output voltage is available which is proportional to the difference of voltage outputs of said light sensitive devices, a paraphase circuit comprising a pair of tubes having a common cathode resistor, means to apply said single ended output voltage to the last mentioned pair of tubes, and means connected with the plate circuits of said last mentioned pair of tubes for conducting the push-pull output from said paraphase circuit.

32. In a light system which has means including at least two light sensitive voltage output producing devices for sensing the spatial position of a light source, a pair of amplifiers for the outputs of said light sensitive devices, a difference circuit into which said outputs are fed and comprising a pair of amplifying tubes with a common cathode resistor, means connecting the plates of said tubes from which a single ended output voltage is available which is proportional to the difference of voltage outputs of said light sensitive devices, a paraphase circuit comprising a pair of tubes having a common cathode resistor, means to apply said single ended output voltage to the last mentioned pair of tubes, means connected with the plate circuits of said last mentioned pair of tubes for conducting the push-pull output from said paraphase circuit, a push-pull power driver connected with the last mentioned means and comprising a pair of amplifying tubes connected to said conducting means, and a power take off associated with said amplifying tubes.

33. In a light system having a plurality of light sensitive devices which produce signal voltages proportional to the intensity of light that falls thereon, the improvement comprising a paraphase circuit connected to the output of each device, two adder tubes, each tube having an output member with which to connect for utilizing the output of said tubes, first means including summing resistors connecting some of the direct signal voltage and reversed signal voltage output points of said paraphase circuits with the common summing point of one of said tubes, and second means including summing resistors connecting some of the direct signal voltage and reversed signal voltage output points of said tubes, at least one of the points of the connecting means being common to both of said connecting means.

34. The combination of claim 33 wherein there are first, second, third and fourth paraphase circuits, said first connecting means are connected to the direct signal voltage outputs of the first and fourth circuits and the reversed signal voltage outputs of the second and third paraphase circuits, and said second connecting means are connected to the direct signal voltage outputs of said first and second circuits and to the reversed signal voltage outputs of said third and fourth paraphase circuits.

35. The combination of claim 33 and; correcting networks, said output members from said tubes supplying said correcting networks with signals from said tubes, and means connected with the output points of said networks for converting the signals received therefrom to push-pull signals.

36. In a light system having light sensitive devices which produce signal voltages proportional to the intensity of light that falls on them, a paraphase circuit connected to the output of at least one of said devices, a pair of adder tubes, first means including summing resistors connecting some of the direct signal voltage and reversed signal voltage output points of said paraphase circuit with the common summing point of one of said tubes, and second means including summing resistors connecting some of the direct signal voltage and reversed signal voltage output points of said tubes.

37. A light energy servo system comprising a primary source of moving light, means responsive to the instantaneous positions of said light for producing electrical signals, a light reflecting device arranged to direct said primary light to said means for producing electrical signals, means connected with said device and signal producing means for deflecting said device to positions corresponding to the intensity and sense of the signals, and a secondary light source reflected by said device to thereby follow movements of the primary light, said light reflective device comprising a housing having opposed transparent walls, a member disposed in said housing, means mounting said member for pivoted movement about intersecting axes in said housing, means connected to said member for applying a bias voltage thereto, and transparent coatings on said opposed housing walls for receiving signal voltages which change the potential between the coatings and the bias voltage on said member to thereby deflect the same.

38. In a light energy system the combination comprising a primary source of movable light, signal producing means responsive to the position of said light, a light reflecting device arranged to direct said primary light to said signal producing means, means connected with said device and with said signal producing means for deflecting said device to positions corresponding to the intensity and sense of the signals, and a secondary light source directed to said device to be reflected to follow movements of the primary light, said device comprising a pivoted light reflective member, a deflection yoke, deflection coils carried by said yoke, a moving coil carried by said light reflective member to establish a magnetic field to interact with the variable fields of said deflection coils to move said member.

References Cited in the file of this patent

UNITED STATES PATENTS

| | | |
|---|---|---|
| 1,750,785 | Randall et al. | Mar. 18, 1930 |
| 1,859,047 | Paulson | May 17, 1932 |
| 1,906,441 | Alexanderson et al. | May 2, 1933 |
| 2,070,787 | Frocht | Feb. 16, 1937 |
| 2,259,323 | Peterman | Oct. 14, 1941 |
| 2,393,631 | Harrison et al. | Jan. 29, 1946 |
| 2,403,915 | Evans | July 16, 1946 |
| 2,463,817 | Soule | Mar. 8, 1949 |
| 2,506,198 | Charles | May 2, 1950 |
| 2,625,659 | Mendelson | Jan. 13, 1953 |
| 2,666,357 | Graham et al. | Jan. 19, 1954 |